United States Patent [19]

Harley et al.

[11] Patent Number: 5,134,297
[45] Date of Patent: Jul. 28, 1992

[54] PERSONAL GAMMA-RAY AND RADON MONITOR

[75] Inventors: Naomi H. Harley; Passaporn Chittaporn, both of Hoboken, N.J.

[73] Assignee: New York University, New York, N.Y.

[21] Appl. No.: 521,178

[22] Filed: May 9, 1990

[51] Int. Cl.$^5$ .......................... G01T 1/02; G01T 1/11
[52] U.S. Cl. ................................ 250/472.1; 250/253; 250/255; 250/484.1
[58] Field of Search .................... 250/253, 255, 472.1, 250/473.1, 337, 484.1 C

[56] References Cited

U.S. PATENT DOCUMENTS

| | | | |
|---|---|---|---|
| 3,505,523 | 4/1970 | Becker | 250/473.1 |
| 4,417,142 | 11/1983 | Malmqvist et al. | 250/253 |
| 4,800,272 | 1/1989 | Harley et al. | 250/253 |

Primary Examiner—Carolyn E. Fields
Attorney, Agent, or Firm—Darby & Darby

[57] ABSTRACT

A compact electrically conductive housing includes a plurality of access ports defined in the top section of the housing to permit radon gas ($^{222}$Rn) to diffuse into the housing. The access ports are covered by a diffusion barrier such as a layer of foam rubber sheet inside the housing. The bottom section of the housing includes an integrally molded, electrically conductive pedestal having three recessed wells therein. Two wells contain a stacked pair of an SSNTD on top of a calcium fluoride TLD. The third well contains the same components, but with the TLD on top of the SSNTD, and the TLD of this stacked pair is pre-dosed with gamma-rays. The pedestal is covered with a film of electrically neutral aluminized MYLAR (polyester film).

17 Claims, 1 Drawing Sheet

PERSONAL GAMMA-RAY AND RADON MONITOR

BACKGROUND OF THE INVENTION a. Field Of The Invention

The invention relates to a device for detecting environmental gamma radiation and radon gas concentrations. In particular, the invention is directed to a simple, low cost device for measuring the actual exposure of a person to radon gas as compared to that person's potential exposure due to his or her remaining in any single location substantially all the time.

b. Description Of The Prior Art

Radon gas ($^{222}$Rn) is a decay product of the element radium ($^{226}$Ra) which is found in soils and rocks throughout the United States and the world. Radon can diffuse through cracks in rocks and through soil pores and enter the breathable atmosphere. Structures such as homes and other buildings can "trap" the $^{222}$Rn inside them because of typical low air ventilation rates. Concentrations of radon gas can possibly rise to high levels. High concentration levels and their adverse effects on humans are known.

Although average household levels are probably orders of magnitude less than mine levels, the risk at these lower concentrations for developing lung cancer may not necessarily be insubstantial, due to the long time that people spend indoors and sometimes spend living in the same home.

With the threat of lung cancer definitively linked to exposure to $^{222}$Rn, it has become necessary to determine where levels of the radon gas are acceptable and where they represent a significant health risk. This can only be done through actual measurement. Stationary measurements, however, may not truly represent actual exposure levels of individuals, because people rarely spend all of their time in any single location.

Accordingly, currently of substantial scientific interest is the issue of actual personal exposure as compared to exposure levels in given locations. Because people tend to move about from place to place, and the time spent in any single location such as in the home or workplace may vary from person to person, there has arisen a need for a personal radon gas monitor.

In general, continuous radon detection instrumentation is costly, large and requires electric power. Such detection equipment is also known to often require operation by highly skilled technicians, and is generally used for research purposes.

In response to the need for large-scale stationary monitoring of radon gas levels, an "integrating" monitor, in which a signal from the varying concentration of radon gas or its products is accumulated and then averaged over the exposure period to obtain a mean concentration, was developed and described in Harley et al., U.S. Pat. No. 4,800,272, Environmental Gamma-Ray And Radon Detector. The entire disclosure of U.S. Pat. No. 4,800,272 is hereby incorporated by reference.

The detector of U.S. Pat. No. 4,800,272 employs lithium fluoride (LiF) thermoluminescent dosimeters (TLDs) to measure both radon gas exposure and gamma-ray exposure. TLDs are known to be reliable radiation measurement devices. Incident radiation displaces valence electrons in its atomic structure. These electrons are trapped in crystal defects intentionally introduced into the crystal lattice structure, and are released under application of sufficient heat energy. Electron release is accompanied by the emission of light in the 250-400 micron wavelength band. The number of photons emitted per unit time period (under predetermined readout conditions) is directly proportional to the radiation exposure, and the analyzing process is entirely electronic (i.e., no optical counting is required).

In the detector of U.S. Pat. No. 4,800,272, three TLDs serving as radiation detectors are enclosed in a small electrically conductive (shielded) housing. A first one of the TLDs is covered by a protective metallized MYLAR (polyester film) sheet, and detects environmental gamma radiation. A second one of the TLDs is covered by an electrostatically charged dielectric materials, or "electret," to concentrate and collect positively charged radon daughters. Further decay of the so-collected radon daughters produces alpha particle damage to the TLD which may later be measure as noted above. A third one of the TLDs is pre-dosed with gamma radiation in order to provide a reference signal indicative of an amount of fading of the first TLD signal representing gamma-ray exposure.

The passive device of U.S. Pat. No. 4,800,272 is intended to remain in a single location for several months, and thus short-term sensitivity is not a concern. Also, the detection limit (also called sensitivity, or lower limit of detection) of the detector has been found to be approximately 90 picoCuries per liter-days (pCi/L days), which is unsuitable for shorter-term measurements of extremely low exposure levels. Although compact, the size of the device of U.S. Pat. No. 4,800,272 is still nonetheless unsuitable for personal radon exposure monitoring.

In an effort to increase the sensitivity (i.e., reduce the lower limit of detection) and reduce the size of a passive gamma-ray and radon monitor, it was attempted to use more sensitive detector materials in the monitor of U.S. Pat. No. 4,800,272. In particular, another known integrating radon detecting material is the solid state nuclear track detector (SSNTD). An SSNTD film such as cellulose nitrate, cellulose acetate, or a carbonic acid diester, incurs radiation damage tracks left by alpha particles emitted by daughters RaA and RaC'. A very small percentage of alpha radiation directly from radon gas decay into its daughters is also detected by the SSNTD. The alpha particles penetrate the dielectric material, leaving tracks which can be made optically visible by chemical etching for subsequent counting.

While advantageously passive in operation, inexpensive and small in size, generally the SSNTD has not in the past been regarded as highly accurate, due to difficulties in track counting. At low environmental levels, track counting has been especially difficult due to presence of flaws in the detector material which appear as tracks, variations caused by the handling and storage history of the particular detector, and variability in the etching process for enhancing track visibility.

Furthermore, when SSNTDs are used in an arrangement similar to that of U.S. Pat. No. 4,800,272, radon radiation alpha track counting is difficult because of non-uniformity of electric charge on the electret. Such non-uniformity of charge has been observed as causing tracks to occur in dense clusters, rendering track counting very difficult, and sometimes impossible.

Finally, an activated carbon monitor which uses a sealed canister filled with activated carbon is known for short-term radon gas exposure monitoring. When the canister is opened, radon gas is adsorbed; the canister is then resealed after a relatively brief period of time, for example, three days. At most, the activated carbon monitor can only be used for periods of about one week. The gamma-ray emissions from radon daughters trapped on the activated carbon may then be counted. This device is highly sensitive to humidity changes and also has the drawback of variable accuracy, since it is possible for radon to desorb from the carbon during the sampling period.

Thus it is seen that there is a need for a compact, silent, low-cost and portable radon detector which has a very low detection limit (i.e., is highly sensitive), and which can be worn on a person's body, so that actual radon exposure levels can be monitored and compared with simultaneously measured environmental radon levels. None of the aforementioned devices have proven satisfactory for this purpose due to the various reasons mentioned. Thus, it has not yet been feasible to undertake large-scale radon measurement programs to determine the actual effects of different environmental levels of radon exposure in private residences and commercial buildings on a particular person or particular group of people.

SUMMARY OF THE INVENTION

A broad object of the invention is to provide an extremely sensitive and highly accurate, yet still practical device for measuring a person's actual exposure to radon gas over a period of time. This measured level of exposure may be compared to ambient levels in buildings or locations where the person spends a portion of his or her time, such as in a private home or in the person's workplace.

More specifically, it is an object of this invention to provide a compact, reliable radon detector which can be distributed to, worn and used for a period of time, and then returned by an average person having average technical or mechanical acuity, so as to easily provide a large number of measurements required for determining actual levels of radon gas exposure, as compared with stationary monitoring in specific locations.

Another object is to provide a compact personal radon and gamma-ray detector in the same device.

Another object of the invention is to provide a low-cost personal radon and gamma-ray detector which is virtually maintenance free in operation.

A further object is to provide a compact, light-weight device for measuring the mean concentration of radon gas to which a person is actually exposed, over a period of about one month, which does not inconvenience the monitored subject in any substantial manner.

Still another object of the invention is to provide a compact personal radon and gamma-ray measuring device which is easily transportable by ordinary mail, parcel post, or the like, without sustaining any damage.

Another object is to provide actual radon and gamma-ray exposure measurements which are preferable to inferred or calculated exposure levels.

Yet another object is to provide an inexpensive personal radon and gamma-ray measuring device which is substantially reusable.

According to the invention, a device for measuring radioactivity exposure due to radon comprises an electrically conductive housing having walls for enclosing a volume of air inside the housing, with at least one wall having at least one opening therethrough for permitting radon gas, but not ambient radon daughters, to continuously diffuse into the volume of air. The device is compact and lightweight, and may suitable be worn by a user on a belt loop or may clipped to an article of clothing in the same manner as is an common electronic paging device or "beeper."

A platform or pedestal inside the housing includes three wells, each of which contains a TLD chip beneath an SSNTD film. The TLD chip detects radiation due to gamma-rays, while the SSNTD film detects signals due primarily to decay of radon daughters. A small number of signals are detected resulting from alpha radiation produced by the decay of radon gas to its daughters. Covering the pedestal and holding the contents of the wells in place is a thin aluminized MYLAR film, held in place by a retaining ring placed over and press-fit onto the pedestal.

Any electrical charge within the housing of the device according to the invention is scrupulously avoided. The diffusion barrier, the electrically conductive housing and the aluminized MYLAR film are all electrically neutral.

Generally according to a preferred embodiment of the invention, a small circular housing comprising a top section and a bottom section is provided. The housing is approximately three inches in diameter and one and one-half inches high, but may advantageously be much smaller, being about the same size as, for example, a large pocket watch. A number of openings or access ports are defined on the top section of the housing to permit radon gas ($^{222}$Rn) to diffuse into the housing. The access ports are preferably covered or partially obstructed by a layer of conductive porous material, such as carbon-loaded urethane, polyurethane or polystyrene, attached to the inside of the housing wall.

The bottom section of the housing includes an integrally molded, electrically conductive platform for housing the radiation detection means according to the invention. In a preferred embodiment, the radiation detection means comprises three stacked pairs of measuring materials, each stacked pair comprising a solid state nuclear track detector (SSNTD) film on top of a thermoluminescent detector (TLD).

The platform is preferably covered with a film of electrically neutral aluminized MYLAR (polyester film).

BRIEF DESCRIPTION OF THE DRAWINGS

Other objects, features and advantages of the invention described in the above brief explanation will be more clearly understood when taken together with the detailed description below and the accompanying drawings, in which.

DETAILED DESCRIPTION OF THE PREFERRED EMBODIMENTS

Figure 1:
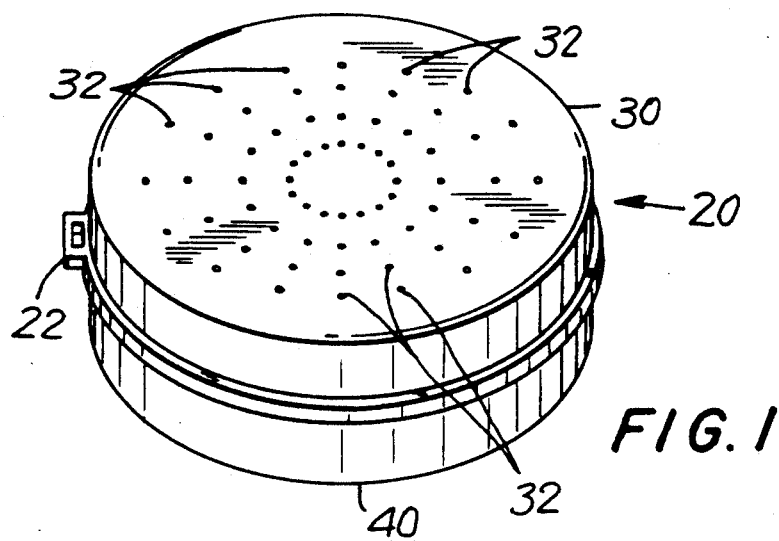
FIG. 1 is a perspective view of a personal radon measuring device according to the invention.

Referring generally to FIG. 1, a preferred embodiment of a personal gamma-ray and radon monitor according to principles of the invention is shown. The monitor 20 comprises a generally cylindrical or circular housing having a top section 30 and a bottom section 40. The top and bottom sections 30,40 are preferably molded to fit together to form a sealed unit when fastened together. Such fastening together of the top and bottom sections 30,40 may be accomplished with threaded screws, as further described below, or by molding the sections with integral threaded portions so that the sections screw together, or by any other suitable fastening means.

An eye or fastening portion 22 is advantageously integrally molded to the housing for attachment of a lanyard, strap, chain or similar fastening means so as to permit the monitor 20 to be worn by a person whose radon exposure level is to be measured.

The housing is preferably constructed from a lightweight, electrically conductive plastic material, such as a conventional carbon-loaded plastic material. The housing may also be fabricated from aluminum sheet, or any other suitable electrically conductive material capable of shielding the inside of the housing from environmental beta-ray flux.

The top section 30 of the housing includes a plurality of openings or through-holes 32 for permitting ambient radon gas to passively enter the monitor 20. This passive diffusion mechanism requires no special equipment, such as pumps or power supplies, to induce air flow into the housing.

As will be readily appreciated, the monitor 20 as just briefly described is designed so as to require a minimum of special construction work such as shaping or milling, and assembly is quite easily completed. It should be understood that there is no special significance to calling one portion a "top" section rather than a "bottom" section, and that this foregoing nomenclature is adopted for the purpose of description only.

The monitor 20 is preferably approximately three inches in diameter by one and one-half inches high, having a general shape and size similar to but slightly smaller than that of a hockey puck. Alternatively, the monitor 20 may be made substantially smaller, having a size and shape generally equal to that of a large pocket watch. A personal monitor of reduced dimensions is preferable due to the savings in cost of production and due to its increased ease of use, i.e., the monitor is less obtrusive to the wearer.

Figure 2:
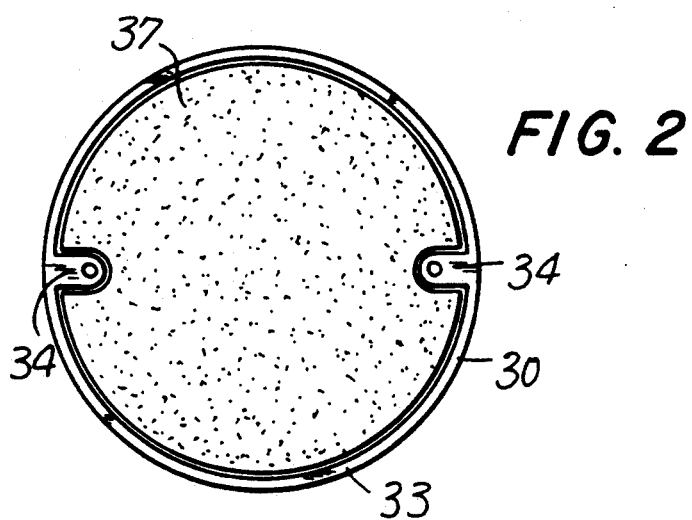
FIG. 2 is a plan view of the inside of the top section of the housing.

FIG. 2 shows the inside of the top section 30 of the housing. The top section 30 of the housing is generally hollow or cup-shaped, having a cylindrical outer wall 33. The top section 30 is preferably provided with at least two integrally molded bosses 34 for receiving fastening screws which may be used to securely fasten the top section 30 to the bottom section 40 of the housing. While the bosses 34 are illustrated as being peripherally located, they need not be so positioned, and the illustrated locations are for ease of manufacture only. The bosses 34, however, should not interfere with the platform or pedestal 50 of the bottom section 40, seen in FIG. 3.

As noted above, the holes 32 constitute diffusion ports for the passage of radon gas into the housing. The diffusion ports 32 are preferably covered by a foam filter material 37, such as conductive urethane, polyurethane or polystyrene foam, which is suitably attached to the inside surface of top section 30. The filter material 37 serves as a diffusion barrier to prevent entry of ambient radon daughters into the personal monitor 20.

Figure 3:
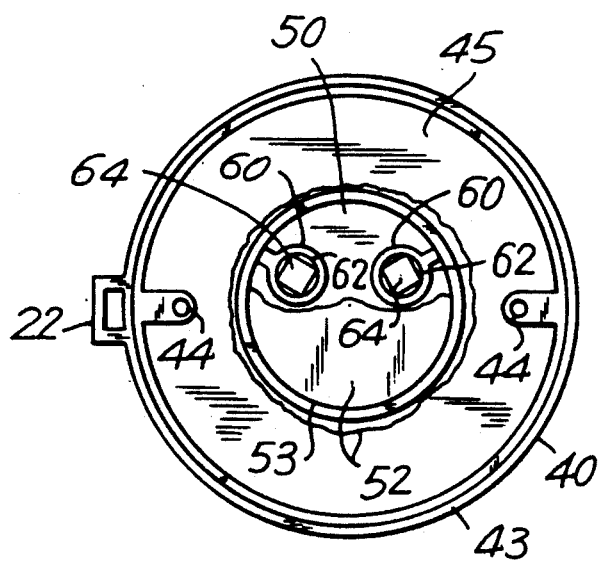
FIG. 3 is a plan view of the inside of the bottom section of the housing.

Turning now to FIG. 3, the specific radiation detecting structures are described in connection therewith. First, however, the bottom section 40 is also seen to be generally hollow or cup-shaped, with a cylindrical outer wall 43 and a bottom wall 45. Integrally molded bosses 34 are provided at locations so as to correspond and mate with the bosses 34 of the top section 30. The bosses 44 may have through-holes therein for receiving fastening screws, which may suitably screw into threaded holes in the bosses 34 of the top section 30. Alternatively, self-tapping screws may be employed to connect the top and bottom sections 30,40 together, in which event threaded holes are unnecessary.

It should be understood that there is no particular significance to the cylindrical shape of the monitor 20. Any shape may be chosen which suitably serves the purposes described herein.

Centrally located on the bottom wall 45 is an integrally molded boss or platform or pedestal 50 for housing the radiation detection means therein. A metallized MYLAR (polyester film) sheet 52 (shown in partial cut-away) covers the pedestal 50 to protect and retain the detector materials therein. The metallized sheet 52 is held in position by a securing ring 53 in press-fit engagement with and around the periphery of the pedestal 50. The rough edge of the metallized sheet 52 is illustrated in FIG. 2 as partially protruding radially outwardly from under the securing ring 53. It will be understood that this is a matter of illustration only; the metallized sheet 52 may or may not so protrude, depending on how carefully the sheet 52 is trimmed during assembly of the monitor 20.

Integrally formed in the pedestal 50 are three wells 60 (only two visible in FIG. 3 underneath the partially cut-away metallized film 52), each approximately one-half inch in diameter. In a preferred embodiment, two of the three wells 60 contain an approximately one-half inch diameter thermoluminescent dosimeter (TLD) chip 62 beneath a plastic SSNTD film 64. In the third well 60 according to the invention, the SSNTD is placed underneath a TLD chip 62 which has been pre-dosed with gamma radiation, the purpose of which will be explained below. This preferred arrangement serves to advantageously perform radiation monitoring functions according to principles of the invention.

The TLD chip 62 preferably used in this invention is a one-half inch diameter, circular, polished crystal of calcium fluoride ($CaF_2$), such as is commercially available from Harshaw, Inc. located in Solon, Ohio. The TLD is preferably approximately 0.9 millimeters thick. This particular TLD material is extremely sensitive to radiation and is therefore well-suited to measuring relatively minute quantities of radiation over relatively short periods of time.

Other possible, but less desirable thermoluminescent materials include lithium fluoride (LiF) (about 30 times less sensitive than $CaF_2$), lithium fluoride ($^7$LiF) in which the $^7$Li isotope predominates at a high atom fraction of 99.99%, calcium fluoride dysprosium ($CaF_2$:Dy), calcium fluoride manganese ($CaF_2$:Mn), still another variety of lithium fluoride ($^6$LiF), calcium sulfate dysprosium ($CaSO_4$:Dy), and lithium borate manganese ($Li_2B_4O_7$:Mn).

The preferred SSNTD film according to the invention is a 9×9 millimeter film of allyl diglycol carbonate, commercially available under the designation "CR-39" from R. S. Landauer, Jr. and Co. located in Glenwood, Ill. The preferred film thickness is approximately 0.9 millimeters.

The metallized sheet 52 mentioned hereinabove serves as a protective cover to protect the SSNTDs 64 and TLDs 62 from visible light and dust. In the preferred embodiment, the sheet material 52 comprises a thin layer of aluminized MYLAR having a weight of, for example, 1.7 milligrams per square centimeter. The sheet 52 is stretched taut by the ring 53 which in turn holds the stacked pairs of detectors firmly to the pedestal 50 in their wells 60.

The metallized sheet 52 is not electrically charged in any manner. There is also an absence of electrical charge on any other component of the monitor 20. It has been found that the presence of electrical charge on the sheet, such as when the sheet is a highly charged electret, causes severe concentrations of nuclear damage tracks on the SSNTD as a result of the inability to place a perfectly uniform charge on the electret. These track concentrations were seen to occur to such a degree that track counting is most difficult, and may even be rendered impossible in some cases. Because the metallized MYLAR sheet 52 does not hold a charge, the radiation damage tracks are substantially uniformly distributed over the SSNTD film 64.

Having now described the structural arrangement of a preferred embodiment of the invention, its functioning will be described.

The wells 60 wherein the SSNTD 64 lie on top of the TLD 62 are used to measure actual exposure to gamma-ray and radiation due to radon gas in duplicate fashion. Environmental gamma-rays from terrestrial sources induce a measurable signal in the TLDs, as do incoming cosmic rays. Both of these types of radiation pass through the SSNTDs to be detected by the TLDs.

The SSNTDs suffer radiation damage tracks left primarily by alpha particles emitted by radon daughters RaA and RaC'. The alpha particles penetrate the surface of the detector material, leaving tracks which can be made optically visible by chemical etching, for subsequent counting. The metallized MYLAR protective sheet 52 results in very little alpha particle loss. It has also been found that the damage tracks may be advantageously counted by placing the SSNTD film on a conventional microfiche reading machine. The illumination and magnification of such machines has been found to be quite satisfactory for this purpose. Preferably, tracks over the entire area of the SSNTD film are counted, rather than over any fractional portion thereof. This improved track counting method, coupled with the use of high quality detector material which has been carefully handled and stored, and further coupled with the scrupulous avoidance of electrical charge on any component of the monitor 20, advantageously overcomes the general prejudice in the art against the use of SSNTDs as a practical radon monitoring material.

The third well 60 contains a TLD which has been predosed with gamma radiation, placed on top of the SSNTD, as noted above. This arrangement permits the determination of the natural or inherent radon background level of the SSNTD (which is shielded by the TLD), as well as determining any possible signal loss (fading) in the gamma-ray measuring TLDs.

For example, the third TLD may be irradiated with a known exposure of gamma-rays prior to placement in the housing. After the monitor 20 has been returned by the user, the net signal per unit of exposure of the irradiated TLD may be compared with that from other TLDs irradiated on or about the date that the signal of the returned irradiated TLD are determined. A comparison of these two signal strengths per unit of gamma-ray exposure can be used to determine the degree of fading, if any, which might have occurred during the monitoring period.

The gamma-ray sensitivity of the TLDs must be known through accurate calibration. This calibration may be accomplished in any generally known conventional manner, such as the method described in U.S. Pat. No. 4,800,272. In addition, the measured SSNTD signal due to decay of radon daughters in the housing must be related to a level of radon gas ($^{222}$Rn) concentration in ambient air. This calibration factor may easily be determined using well-known techniques, wherein the personal monitor 20 is exposed to known concentrations of radon gas ($^{222}$Rn) under controlled circumstances.

The lower limit of detection of the new gamma-ray and radon monitor as described hereinabove is about one picoCurie per liter day (pCi/L day). The very low inherent radon background of allyl diglycol carbonate permits detection of very low levels of radon. The monitor can measure 20 pCi/L days (i.e., 2 pCi/L for 10 days) with ± 20% precision. This compares very favorably to the best possible results for activated carbon canister monitors, the only other potentially suitable radon monitoring device for personal exposure monitoring.

While one preferred embodiment of the invention has been described in detail, it will be understood that many variations and modifications are possible without departing from the spirit and scope of the invention. For example, there is shown in FIG. 3 an open area between the pedestal 50 and the outer wall 43 of the bottom section 40 of the housing. The radon collection efficiency of this area is known to be low, and thus this space may advantageously be eliminated. Such a modification would yield the pocket-watch sized monitor previously mentioned.

Another possible modification involves simplifying the monitor by eliminating the protective metallized MYLAR sheet 52 and its associated retaining ring 53. This may be accomplished by metallizing the SSNTDs directly, and fastening or fixedly mounting the stacked SSNTD/TLD pairs in the wells.

We claim:

1. A personal radiation monitor comprising:
   an electrically conductive housing having walls defining an internal volume of space;
   at least one hole through a wall of the housing for permitting entry of ambient air into the internal volume;
   a first stacked pair of detectors disposed within the housing, the first stacked pair of detectors comprising a first solid state nuclear track detector film on top of a first thermoluminescence dosimeter; and
   a second stacked pair of detectors disposed within the housing, the second stacked pair of detectors comprising a second thermoluminescence dosimeter on top of a second solid state nuclear track detector film;
   and wherein there is substantially no electrical charge present on any portion of the personal radiation monitor.

2. The monitor of claim 1, wherein the first thermoluminescence dosimeter is disposed between the first solid state nuclear track detector film and an internal detector mounting portion integral with a wall of the housing, and wherein the second solid state nuclear track detector film is disposed between the second thermoluminescence dosimeter and the internal detector mounting portion.

3. The monitor of claim 2, wherein the first and second stacked pairs of detectors are retained substantially against the internal detector mounting portion by a metallized polyester film sheet removably secured thereto.

4. The monitor of claim 1, further comprising:
a diffusion barrier disposed on an inside surface of the hole-containing wall of the housing.

5. The monitor of claim 1, further comprising:
means for permitting the monitor to be worn by a person.

6. The monitor of claim 1, wherein the housing is formed of carbon-loaded plastic.

7. The monitor of claim 1, wherein the first and second thermoluminescence dosimeters comprise chips of calcium fluoride ($CaF_2$).

8. The monitor of claim 7, wherein the first and second solid state nuclear track detector films comprise films of allyl diglycol carbonate.

9. The monitor of claim 1, wherein the first and second solid state nuclear track detector films comprise films of allyl diglycol carbonate.

10. The monitor of claim 1, wherein the second thermoluminescence dosimeter is pre-dosed with radiation.

11. A personal radiation monitor comprising:
a compact, electrically conductive housing having a top section and a bottom section, the sections being detachably connected together to form an internal volume of space therein;
means attached to one of the top and bottom sections for permitting the monitor to be worn by a person;
at least one diffusion port formed in the top section of the housing for permitting ambient air to diffuse into the internal volume of space;
a diffusion barrier disposed on an inner surface of the top section to selectively prevent entry by predetermined matter into the internal volume of space;
a pedestal integral with a wall of the bottom section, the pedestal having at least two wells formed therein;
a first stacked pair of detectors disposed within one of the pedestal wells, the first stacked pair of detectors comprising a first solid state nuclear track detector film on top of a first thermoluminescence dosimeter;
a second stacked pair of detectors disposed in another of the wells, the second stacked pair of detectors comprising a second thermoluminescence dosimeter on top of a second solid state nuclear track detector film; and
a metallized plyester film sheet removably secured to the pedestal, the sheet retaining the first and second stacked pairs of detectors in their respective wells;
and wherein there is substantially no electrical charge present on any portion of the personal radiation monitor.

12. The monitor of claim 11, wherein the first and second thermoluminescence dosimeters comprise chips of calcium fluoride ($CaF_2$).

13. The monitor of claim 12, wherein the first and second solid state nuclear track detector films comprise films of allyl diglycol carbonate.

14. The monitor of claim 11, wherein the first and second solid state nuclear track detector films comprise films of allyl diglycol carbonate.

15. The monitor of claim 11, wherein the second thermoluminescence dosimeter is pre-dosed with radiation.

16. The monitor of claim 11, further comprising:
a third stacked pair of detectors disposed within a third well formed in the pedestal, the third stacked pair of detectors being substantially identical to the first stacked pair of detectors.

17. The monitor of claim 11, wherein the monitor has a detection limit of approximately one picoCurie per liter day.

* * * * *